United States Patent [19]
Schultz

[11] Patent Number: 6,157,723
[45] Date of Patent: *Dec. 5, 2000

[54] METHOD AND APPARATUS FOR SECURE COMMUNICATIONS WITH ENCRYPTION KEY SCHEDULING

[75] Inventor: Charles P. Schultz, Hialeah, Fla.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/805,868

[22] Filed: Mar. 3, 1997

[51] Int. Cl.$^7$ ....................................................... H04L 9/08
[52] U.S. Cl. ........................... 380/273; 380/249; 380/277
[58] Field of Search .................... 380/273, 249, 380/48

[56] References Cited

U.S. PATENT DOCUMENTS

| | | |
|---|---|---|
| 4,182,933 | 1/1980 | Rosenblum ................................ 179/15 |
| 4,776,011 | 10/1988 | Busby ........................................ 380/37 |
| 4,853,962 | 8/1989 | Brockman ................................. 380/44 |
| 5,146,498 | 9/1992 | Smith ........................................ 380/21 |
| 5,237,610 | 8/1993 | Gammie et al. ........................... 380/10 |
| 5,249,230 | 9/1993 | Mihm, Jr. .................................. 380/23 |
| 5,434,910 | 7/1995 | Johnson et al. ........................... 379/89 |
| 5,618,772 | 4/1997 | Suda et al. ............................... 502/238 |
| 5,870,475 | 2/1999 | Allan et al. ............................... 380/21 |

*Primary Examiner*—Gilberto Barron, Jr.
*Assistant Examiner*—Douglas J. Meislahn
*Attorney, Agent, or Firm*—Andrew S. Fuller

[57] ABSTRACT

A communication device (122) supports secure communications using automated encryption key scheduling. The communication device (122) is provided with access to one or more schedules having entries of specific time periods, such as date and time of day information, that govern selection of encryption keys. A schedule is selected and accessed using current time information to obtain an encryption key (310, 320, 330). Subsequent communications are conducted using the obtained encryption key (340).

1 Claim, 3 Drawing Sheets

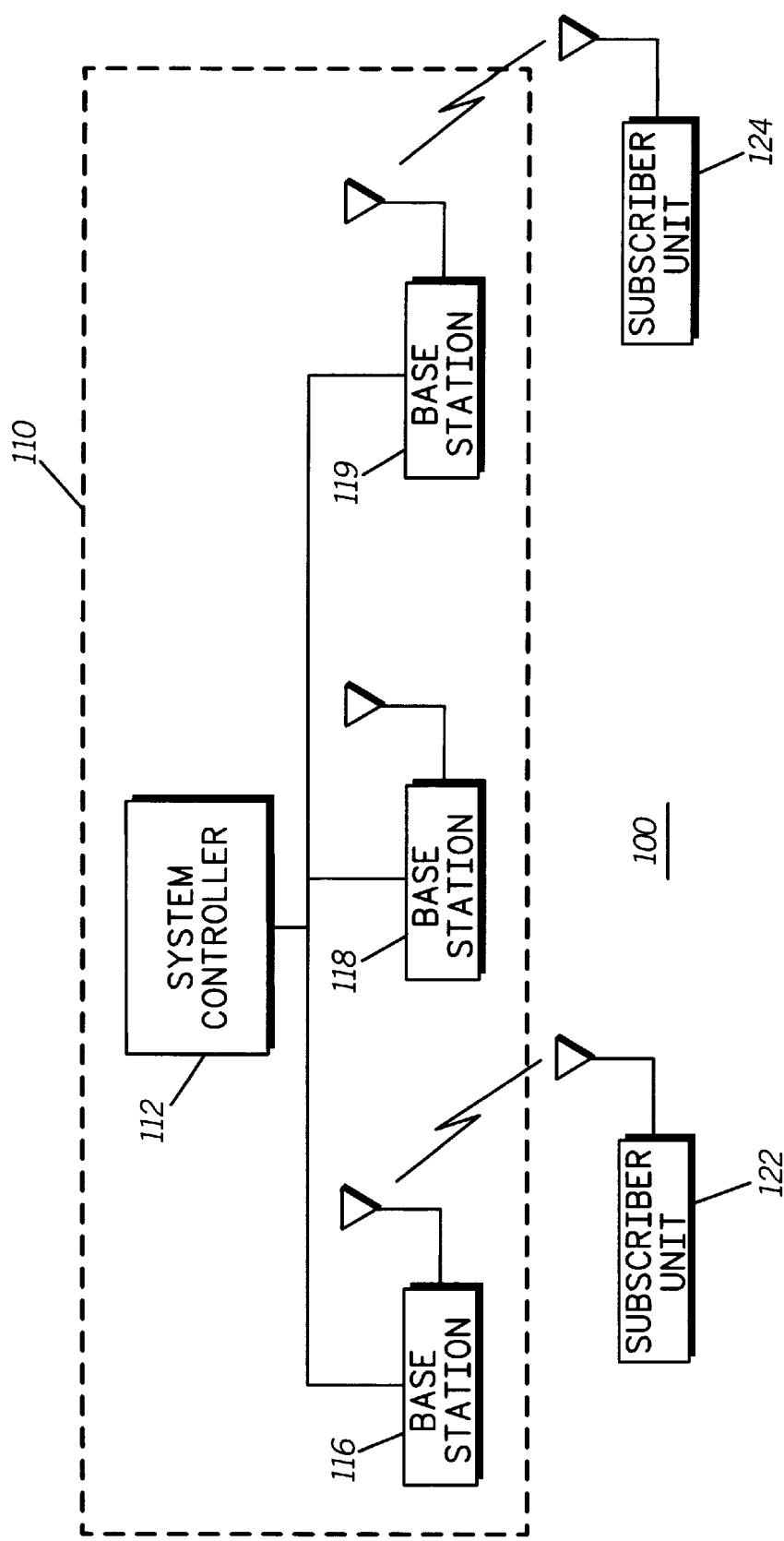

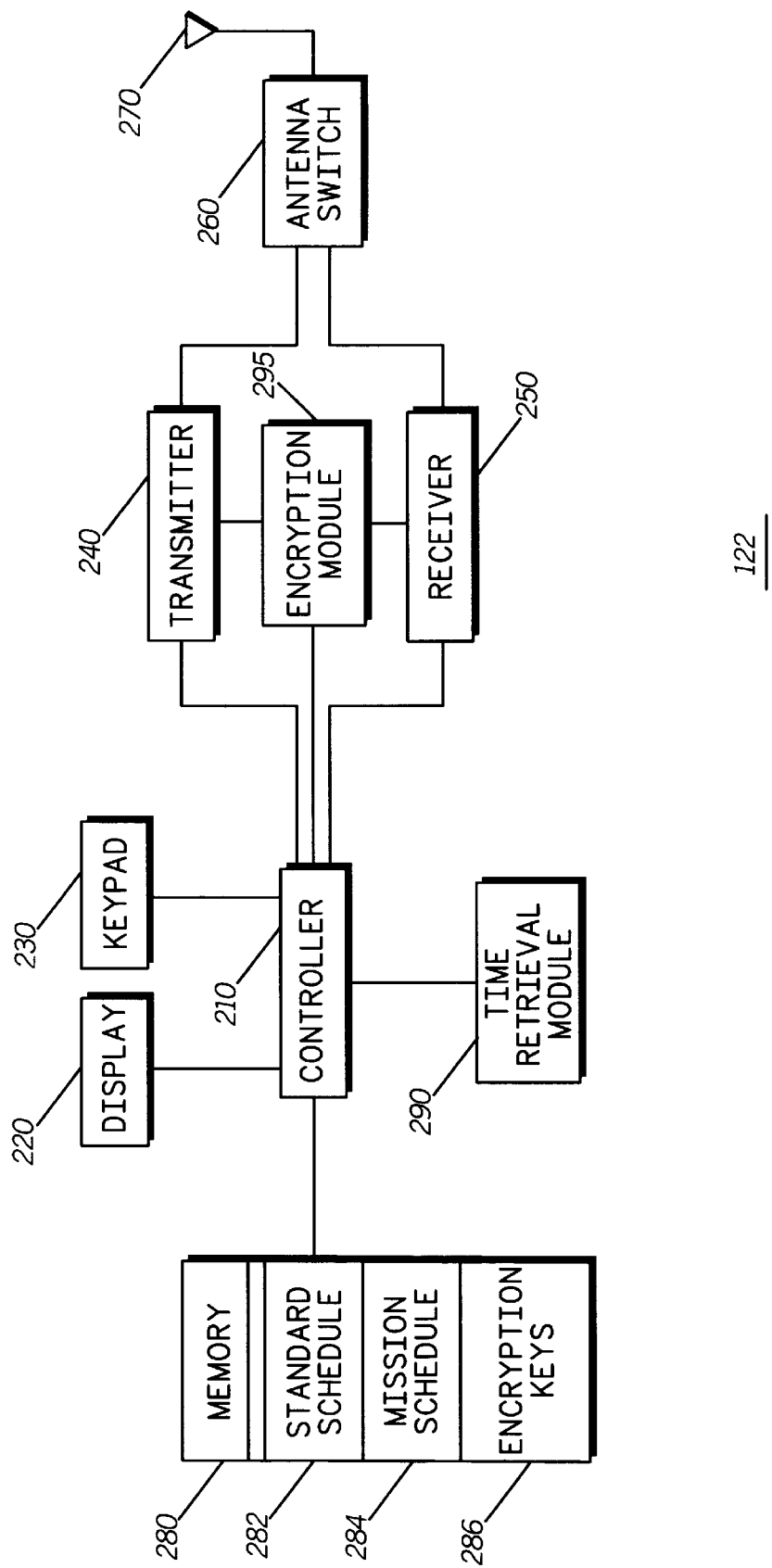

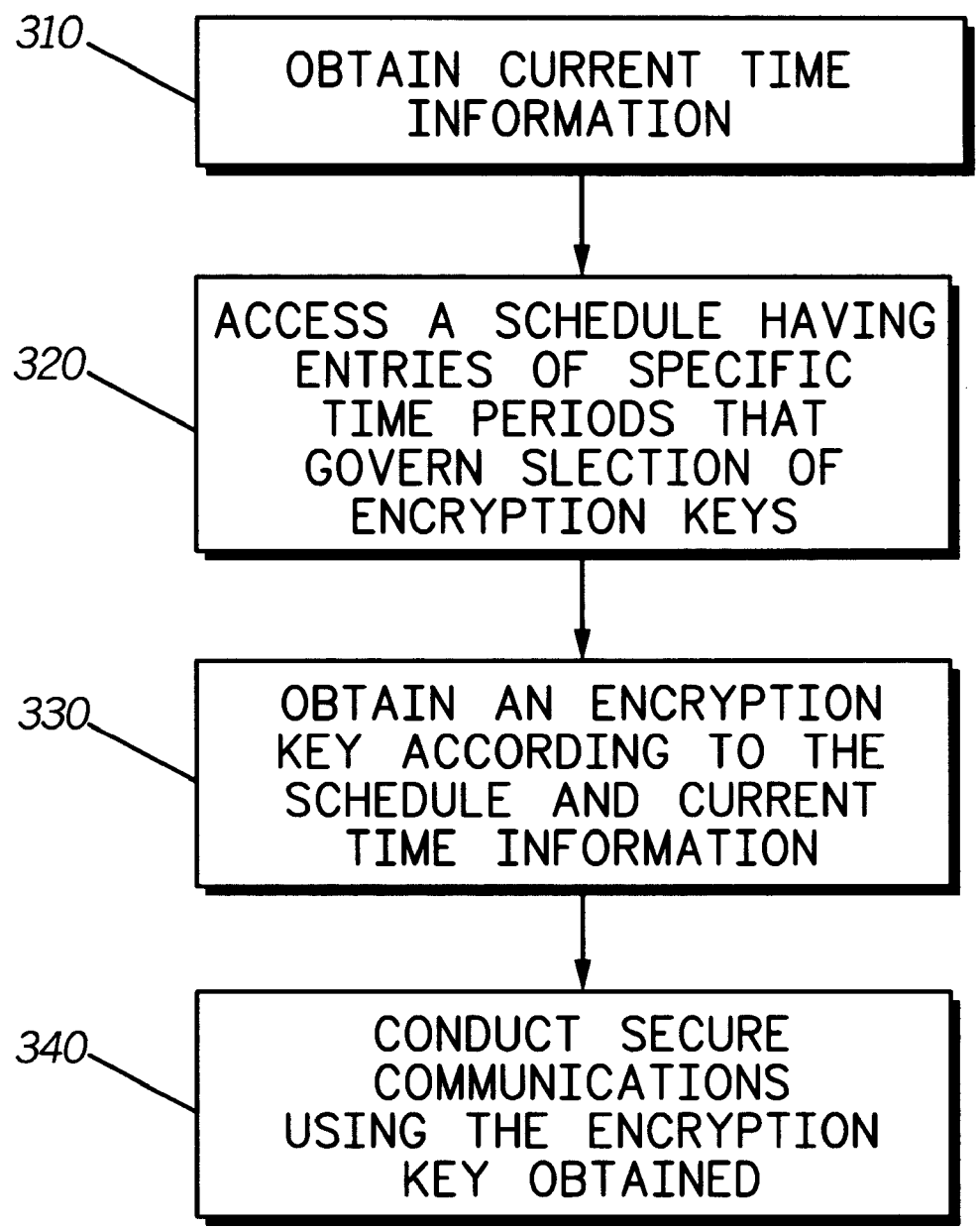

METHOD AND APPARATUS FOR SECURE COMMUNICATIONS WITH ENCRYPTION KEY SCHEDULING

TECHNICAL FIELD

This invention relates in general to radio communication devices, and more particularly, to radio communication devices that provide for secure communications.

BACKGROUND

Encryption has been used to provide for secure communication between participants in a radio communication system. One prior art arrangement is based on the use of a public algorithm, such as the Data Encryption Standard (DES), in conjunction with a privately maintained encryption key to enable secure communications. In such cases, it is common to periodically change the encryption keys to maintain the integrity of the system.

A radio communication system may employ multiple encryption keys, each governing communications for a particular subset of users on the system. In this manner, distinct communication groups may be created to provide for separate operation, or to provide for differing levels of security. It is known to provide a radio communication device with a set of encryption keys which are user selectable. In one approach, the user determines when a new key selection is required and enter the required key into the device. Another approach uses over-the-air rekeying transmissions or similar remote keying operation. Over-the-air rekeying allows systems to remotely reconfigure a radio communication device with a new key. One disadvantage is that once a key has been compromised the rekeying information is also available to an unauthorized listener. Another disadvantage is that the communication device needs to be available when rekeying is occurring throughout the system to retain secure communication capability.

It is desirable to provide for flexibility in the use of encryption keys when engaged in secure communications. The prior art implements a variety of methodologies of varying degrees of complexity and effectiveness. However, improvements are needed in the management of key selections for secure communications.

BRIEF DESCRIPTION OF THE DRAWINGS

FIG. 1 is a block diagram of a radio communication system, in accordance with the present invention.

FIG. 2 is a block diagram of a radio communication device operating within the system of FIG. 1, in accordance with the present invention.

FIG. 3 is a flowchart of procedures for the radio communication device, in accordance with the present invention.

DETAILED DESCRIPTION OF THE PREFERRED EMBODIMENT

The present invention provides for secure communications with automated encryption key scheduling. A communication device is provided with access to one or more schedules having entries of specific time periods that govern selection of encryption keys. The specific time periods preferably include date or day of the week information, and time of day information. The radio communication device obtains current time information, such as from an internal or external source, and uses this time information to obtain an encryption key according to an operative schedule. In one embodiment, the encryption key is retrieved from a list of prestored encryption keys. In another embodiment, the encryption key is generated using a key generating function. Communications are then conducted using the obtained encryption key.

FIG. 1 shows a block diagram of a radio communication system 100, in accordance with the present invention. The radio communication system 100 includes service provider equipment 110, and subscriber units 122, 124. The provider equipment 110 includes a system controller 112, and base stations 116, 118, 119. The base stations 116, 118, 119 are coupled to the system controller 112 and are ordinarily geographically dispersed to service subscriber units in specific geographic regions. The system controller 112 performs communication management and access control for the subscriber units 122, 124 in a manner well known in the art. The subscriber units 122, 124 are radio communication devices that interface with the system controller 112 via wireless communication links established with the base stations 116, 118, 119. The subscriber units 122, 124 may be portable or mobile radio telephones that work in conjunction with the base stations 116, 118, 119 and system controller 112 to provide a user with secure and non-secure communication services. The subscriber units 122, 124 may operate in a variety of communication modes including telephone interconnect, short message service, dispatch or instant conferencing, circuit data, packet data and combinations thereof, as well as other data services. Ordinarily, communication between subscriber units 122, 124 is routed through the system controller 112 in a trunked access manner. However, the concepts of the present invention are equally applicable to radio communication systems employing conventional communication management.

FIG. 2 shows a block diagram of a radio communication device ("radio"), such as subscriber unit 122, in accordance with the present invention. Other subscriber units 124 are similarly constructed. The communication device 122 is preferably a two-way radio or radio telephone that is operable to provide telephone interconnect, paging, dispatch, and circuit/packet data services. In the radio 122, a controller 210 is coupled to a memory 280, to a transmitter 240, and to a receiver 250. The transmitter 240 and receiver 250 are coupled via an antenna switch 260 to an antenna 270. For transmit operations, the controller 210 configures the antenna switch 260 to couple the transmitter 240 to the antenna 270. Similarly, for receive operations the controller 210 couples the antenna 270 via the antenna switch 260 to the receiver 250. The radio 122 also includes a display 220 and keypad 230 that together provide a user interface for accessing radio functions, and for manipulating radio features. Overall operational control is conducted in conjunction with instructions stored in the memory 280.

According to the present invention, the radio 122 includes components for implementing schedule based encryption key selection for secure communications. In the preferred embodiment, the memory 280 stores a set of encryption keys 286 together with a set of key schedules 282, 284, each having entries that associate a specific time period with an encryption key selector. The set of schedules preferably includes a standard schedule 282 for normal secure operations, and a mission schedule 284 for special case situations. The operative schedule is user selectable via the user interface 220, 230. The schedules 282, 284 may be preprogrammed within the memory 280 via a programming device (not shown), via an over the air transmission, or via the user interface 220, 230. Each schedule has entries of specific time periods that govern selection of encryption keys. The encryption key selector is preferably a reference to one of the encryption keys 286 stored in memory 280. In an alternative embodiment, the encryption key selector may designate a key generating function, or parameters for a key generating function. The specific time periods are preferably formatted to have date or day of week information, and time of day information. The specific time period may represent absolute time, such as a given calendar date and time, or may represent a relative time with respect to a given configurable start time. Additionally, a specific time period may be defined as a time range, including a start and stop time, or as a single time entry. When a time range is specified, the associated key is operable only during that time range. When a single time entry is specified the associated key is used until another time period takes precedence The present invention allows for key schedules having schedule entries with overlapping time periods. In such cases, a schedule entry is selected when it has a more narrowly defined specific time period then another with an overlapping time period. An example key schedule is shown in the table below, where the specific time period is defined using a single time entry:

| Date/Day of Week | Time of Day | Encryption Key Selector |
|---|---|---|
| Daily | 700 | 1 |
| Daily | 1300 | 2 |
| Wednesday | 1400 | 3 |
| Daily | 1500 | 2 |
| 2/27/97 | 1600 | 1 |

The radio 122 further includes a time retrieval module 290 and an encryption module 295. The time retrieval module 290 provides current time information which can be used to derive date and time of day information for use with the key schedule. The time retrieval module 290 has an internal real time clock (not shown) which maintains time information. Preferably, the time retrieval module 290 is coupled to the receiver 250 through the controller 210 to receive over-the-air transmissions of current time information to override or supplement the internal clock. The encryption module 295 is coupled to the controller 210, which provides operational control. The encryption module 295 is coupled to the time retrieval module 290 and to the memory 280 through the controller 210. The encryption module 295 uses the current time information to provide encryption based on an encryption key selected according to an entry in the key schedule that has a corresponding specific time period. The encryption module 295 is coupled to the transmitter 240, and is used by the controller 210 to provide encryption for voice and data transmissions. The encryption module 295 is coupled to the receiver 250 and provides decryption for voice and data signals received.

FIG. 3 is a flowchart of procedures 300 used by the radio communication device 122 to perform schedule based encryption, in accordance with the present invention. Ordinarily, the communication device stores a set of encryption keys, and one or more key schedules in local non-volatile memory. The schedules may be obtained from a programming device, entered by a user via the user interface, or downloaded via an over-the-air transmission. In operation, the radio communication device obtains current time information from the time retrieval module, step 310. The current time information may be obtained from a local source, such as an internal clock or from an over-the-air transmission from a system controller. The communication device then accesses a schedule that has entries of specific time periods that govern selection of encryption keys, step 320. Ordinarily, the radio communication device has an operative schedule, i.e., a schedule designated as the active schedule. A schedule may be selected as active by the user, by a remote system or remote communication device that interfaces with the communication device, or as a default. The operative schedule may be selected from among a set of preprogrammed schedules using a particular selection criteria. In the preferred embodiment, the communication device includes as preprogrammed schedules, a standard schedule for normal operations, and a mission schedule for special mission operations. The mission schedule is used to override the standard schedule based on inputs from a user. Preferably, the radio automatically reverts to the standard schedule from the mission schedule when the mission no longer applies. Thus, at any particular time, the communication device may obtain user input specifying a schedule for selection, i.e., specifying the operative schedule.

The communication device obtains an encryption key according to the operative key schedule and current time information, step 330. Preferably, the operative key schedule is accessed to select an encryption key from a stored set of encryption keys. Alternatively, the key schedule may be accessed, using the current time information, to obtain information that is used to generate an encryption key using a key generating function. In this alternative embodiment, the radio uses a key generating function as described in U.S. Pat. No. 5,146,498 issued to Smith, on Sep. 8, 1992, for remote Key Manipulations For Over-The-Air Re-keying, the entire contents of which are hereby incorporated by reference.

Once an encryption key is selected, the communication device conducts subsequent secure communications using the selected encryption key, step 340. Thus, voice and data transmissions are encrypted using the encryption key for secure communications. Similarly, when secure communications is received it is decrypted using the encryption key.

The present invention offers significant benefits over the prior art. The radio automatically selects an encryption key based on a schedule and current time information, without any interaction by the user. Current time information can be synchronized among communicating devices by using over-the-air transmissions. Accordingly, an improved method of encryption key management is provided.

What is claimed is:

1. In a radio communication device, a method of communicating comprising the steps of:

storing a plurality of encryption keys;

storing first and second key schedules each having entries that associate the plurality of encryption keys with specific time periods, wherein each specific time period has a start time and an end time relating to the time of day and the date or day of the week, the key schedules being obtained from a remote device from an over-the-air transmission;

selecting one of the first and second key schedules;

obtaining current time information including date or day of the week information from an over-the-air transmission from said remote device;

accessing the selected key schedule to select an encryption key from the plurality of encryption keys based on the current time information, including the step of determining whether the current time information indicates a time in between the start time and the end time corresponding to one or more particular entries in the key schedule, and if it is more than one particular entry selecting the more narrowly defined particular entry; and encrypting transmissions using the selected encryption key.

* * * * *